United States Patent [19]

Nakaya et al.

Best Available Copy

[11] E Re. 30,411

[45] Reissued Oct. 7, 1980

[54] PROCESS FOR PURIFYING SODIUM HYDROXIDE

[75] Inventors: Keiichi Nakaya, Chiba; Suekazu Hirata; Kunio Sato, both of Ichihara, all of Japan

[73] Assignee: Asahi Glass Company, Limited, Tokyo, Japan

[21] Appl. No.: 901,032

[22] Filed: Apr. 28, 1978

Related U.S. Patent Documents

Reissue of:

[64] Patent No.: 4,065,270
Issued: Dec. 27, 1977
Appl. No.: 677,754
Filed: Apr. 16, 1976

[30] Foreign Application Priority Data

Apr. 28, 1975 [JP] Japan ..... 50-50677

[51] Int. Cl.[3] ..... B01D 9/02

[52] U.S. Cl. ..... 23/299; 23/302 T; 209/165; 423/179; 423/641

[58] Field of Search ..... 209/164, 165, 166, 11; 23/300, 302 T, 302, 299, 303; 423/179, 641, 184, 192; 159/DIG. 5

[56] References Cited

U.S. PATENT DOCUMENTS

| | | | |
|---|---|---|---|
| 2,699,377 | 1/1955 | Dancy | 209/166 |
| 3,477,829 | 11/1969 | Dockendorf et al. | 23/302 T |
| 3,479,281 | 11/1969 | Kikindai | 209/164 |
| 3,551,897 | 12/1970 | Cooper | 209/166 |
| 3,701,421 | 10/1972 | Maxwell | 209/164 |
| 3,799,749 | 3/1974 | Moyer et al. | 23/302 T |
| 3,854,299 | 12/1974 | Myers et al. | 23/302 T |
| 3,922,154 | 11/1975 | Kawasaki et al. | 23/302 T |

FOREIGN PATENT DOCUMENTS

| | | | |
|---|---|---|---|
| 50-8707 | 4/1975 | Japan | 23/300 |
| 52-32497 | 3/1976 | Japan | 23/302 T |

OTHER PUBLICATIONS

Hightoner, "The Trona Process . . . and its Unique Features", Chemical Engineering, pp. 104–106, (Aug. 1951).

*Primary Examiner*—Hiram H. Bernstein
*Attorney, Agent, or Firm*—Oblon, Fisher, Spivak, McClelland & Maier

[57] ABSTRACT

An aqueous solution of sodium hydroxide containing soluble impurities such as a concentrated catholyte produced by a diaphragm electrolysis is cooled by a coolant or a heat-exchanger to form a slurry containing sodium hydroxide hydrate crystals and fine impurity crystals. The fine impurity crystals are adsorbed on bubbles which are formed by vaporizing a dissolved coolant or introducing a gas in the slurry and separated from the slurry.

17 Claims, 3 Drawing Figures

PROCESS FOR PURIFYING SODIUM HYDROXIDE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a process for purifying sodium hydroxide. More particularly, it relates to a process for producing sodium hydroxide having high purity from an aqueous solution of sodium hydroxide containing soluble impurities such as sodium chloride.

DESCRIPTION OF THE PRIOR ART

The process for producing sodium hydroxide and chlorine by electrolysis of an aqueous solution of sodium chloride with a diaphragm such as asbestos, is advantageous since no mercury pollution is caused in contrast to the mercury method.

However, the concentration of sodium hydroxide produced by the diaphragm electrolysis method, has been disadvantageously low, such as about 8 to 10 wt. %. Substantially the same amount of sodium chloride is produced.

Customarily, an aqueous solution of sodium hydroxide prepared by the diaphragm method has been concentrated by distillation to about 50 wt. % or higher which is required for industrial purposes. Impurities such as sodium chloride which are precipitated in the step are removed to purify the product.

However, the resulting sodium hydroxide still contains about 1 to 2 wt. % of sodium chloride. It has been quite difficult to decrease the content of sodium chloride to 0.01 to 0.001 wt. % which is typical for the products of mercury method.

It is known that the aqueous solution of sodium hydroxide containing sodium chloride prepared by the diaphragm electrolysis method can be diluted to about 40% of sodium hydroxide to form an unsaturated condition for the sodium chloride. The diluted solution is cooled to precipitate only $NaOH.3.5\ H_2O$ crystals and the precipitate is separated and melted.

The aqueous solution of sodium hydroxide produced by this process has a relatively low concentration and should be concentrated to the finally desired level. Accordingly, the process has not been satisfactory from the viewpoints of the apparatus complexity and energy expended. On the other hand, it is known that the aqueous solution of sodium hydroxide of about 50 wt. % or higher, can be cooled to form $NaOH.2H_2O$ in order to purify it without diluting an aqueous solution to form the unsaturated condition for sodium chloride.

The latter process is advantageous since the calories needed for the evaporation of water are small in comparison with the former process for precipitating only $NaOH.3.5H_2O$ crystals while controlling the concentration of the aqueous solution from the viewpoints of both the apparatus and the energy expended.

However, in accordance with the latter process, impurities such as sodium chloride precipitate together with the NaOH hydrate crystals. Accordingly, it is necessary to separate the sodium chloride crystals from the NaOH hydrate crystals.

To do this various methods have been proposed. These utilize the fact that the NaOH hydrate crystals are relatively large whereas the impurity crystals such as sodium chloride are relatively small.

It is also known that only impurity crystals such as sodium chloride will be removed by washing with a liquid flow (e.g. U.S. Pat. No. 3,799,749) and that fine impurity crystals such as sodium chloride can be separated from the NaOH hydrate crystals by filtration (e.g. U.S. Pat. Nos. 2,127,496 and 2,178,694).

However, in these methods, the viscosity of the solution treated is relatively high requiring a large size apparatus and causing difficulties in the filtration. Incomplete separation disadvantageously results.

SUMMARY OF THE INVENTION

It is an object of the present invention to provide a process for highly purifying sodium hydroxide by removing soluble impurities such as sodium chloride from an aqueous solution of sodium hydroxide.

It is another object of this invention to highly purify sodium hydroxide by separating soluble impurity crystals such as sodium chloride from NaOH hydrate crystals which are formed by cooling an aqueous solution of sodium hydroxide containing such soluble impurities.

It is still another object of this invention to provide a process for highly purifying sodium hydroxide in high concentration by removing impurities such as sodium chloride from an aqueous solution of high concentration sodium hydroxide prepared by electrolysis of an aqueous solution of sodium chloride by the diaphragm electrolysis method and subsequent concentration of the catholyte.

These and other objects of the present invention have been attained by cooling an aqueous solution of sodium hydroxide containing soluble impurities, such as sodium chloride, to form a slurry containing sodium hydroxide hydrate crystals and fine impurity crystals; floating the fine impurity crystals by their adsorption or bubbles which are formed by vaporizing a dissolved coolant or by introducing a gas into the slurry containing the crystals; and separating the fine impurity crystals from the sodium hydroxide hydrate crystals.

DETAILED DESCRIPTION OF THE PREFERRED EMBODIMENTS

Figure 1:
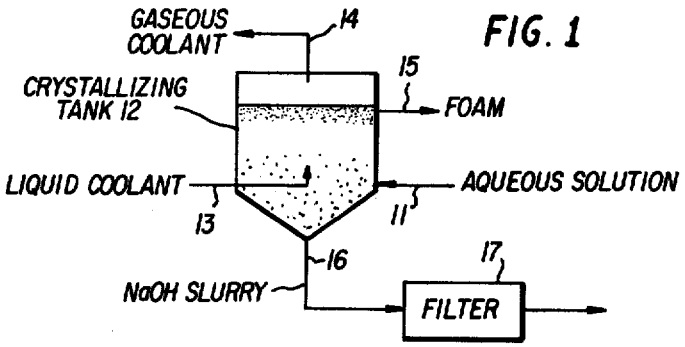
FIG. 1 is a flow diagram of a batch system for purification of sodium hydroxide according to the invention.

Customarily, sodium hydroxide hydrate crystals (NaOH hydrate crystals) and impurity crystals such as sodium chloride are formed by cooling an aqueous solution of sodium hydroxide containing such impurities thereby forming a slurry thereof.

In the process of this invention, it is preferred to form a slurry containing 5 to 60 wt. %, especially 10 to 40 wt. %, of NaOH hydrate crystals and the impurity crystals.

The NaOH hydrate crystals are usually large size crystals having an average diameter of 300 to 3000 μm whereas the NaCl impurity crystals are usually small size crystals having a diameter of 2 to 30 μm. It has now been discovered that fine crystals of impurities such as NaCl are selectively adsorbed on bubbles rising through the slurry of the crystals.

On the other hand, the NaOH hydrate crystals have substantially no such properties. Accordingly, the impurity crystals can be easily separated from the NaOH hydrate crystals by introducing bubbles into the slurry of both crystals.

The present invention is based on this novel finding.

In accordance with the process of this invention, impurity crystals such as NaCl are separated from NaOH hydrate crystals by a operation to a high degree simple in comparison with conventional processes. Sodium hydroxide having a purity similar to that which is a product of the mercury method, is produced. The process of this invention can be applied to aqueous solutions of sodium hydroxide having various concentrations, including high concentration sodium hydroxide which is produced by the electrolysis of an aqueous solution of sodium chloride followed by concentration.

Accordingly, the process of this invention is remarkably advantageous for industrial operation.

The object and advantages of this invention can be further understood by the following illustration.

The aqueous solution of sodium hydroxide containing impurities such as NaCl includes the product of the diaphragm electrolysis of an aqueous solution of sodium chloride using a diaphragm such as asbestos. This is concentrated by suitable methods such as evaporation to remove the major portion of sodium chloride.

The impurities include sodium chloride and one or more impurities which precipitate as insoluble material from the concentrated solution of sodium hydroxide, such as sodium sulfate, sodium carbonate, calcium hydroxide, magnesium hydroxide and the like.

The concentration of sodium hydroxide and sodium chloride in the aqueous solution is dependent upon the desired NaOH hydrate and can be selected accordingly.

When an aqueous solution containing 33 to 60 wt. % of NaOH and 3.6 to 0.1 wt. % of dissolved NaCl is used, it is possible to attain satisfactory results in industrial operation from the viewpoint of conversion to the NaOH hydrate and easy separation of sodium chloride.

The aqueous solution of sodium hydroxide containing impurities is cooled to form crystals. The method of cooling the aqueous solution is not critical and includes use of a heat-exchanger.

However, it is preferred to introduce a liquid coolant which does not react with sodium hydroxide directly into the aqueous solution whereby the liquid coolant is vaporized to cool the aqueous solution and the NaOH hydrate crystals and the impurity crystals are formed.

In this case, there is no disadvantage due to decrease of the transfer coefficient and clogging caused by the precipitation of the NaOH hydrate crystals onto the cooling surfaces of the heat-exchanger.

Moreover, the bubbles formed in the aqueous solution by the vaporization of the liquid coolant, can be utilized as the source of bubbles for the adsorption and separation of impurities. Accordingly it is preferred to use such a coolant in this invention.

Typical coolants include fluorochlorohydrocarbons having a low boiling point such as fluorotrichloromethane, difluorodichloromethane and difluoromonochloromethane; and hydrocarbons having a low boiling point such as propane, n-butane and isobutane which are inert to sodium hydroxide. It is especially preferred to use fluorochlorohydrocarbons having a low boiling point.

The temperature for cooling the aqueous solution is dependent upon the type of NaOH hydrate used in the purification step. It is preferred to cool the aqueous solution to the point of supersaturation of sodium hydroxide. The concentration of sodium hydroxide in the aqueous solution is dependent upon the type of NaOH hydrate crystals formed in the cooling operation. The concentration of the aqueous solution of sodium hydroxide, the type of NaOH hydrate and the range of temperature for forming the NaOH hydrate may be chosen as follows.

In the purification of this invention, it is possible to use any of the hydrates shown in the table.

TABLE

| NaOH concentration | NaOH hydrate | Temperature (°C.) |
|---|---|---|
| 52–69 | $NaOH . H_2O$ | 12 to 65 |
| 45–52 | $NaOH . 2H_2O$ | 5 to 12 |
| 33–45 | $NaOH . 3.5H_2O$ | 5 to 16 |
| 25–33 | $NaOH . 4H_2O$ | −18 to +5 |
| 22–33 | $NaOH . 5H_2O$ | −24 to −18 |

It is especially preferred to use $NaOH.2H_2O$ because the aqueous solution of sodium hydroxide produced by the diaphragm electrolysis method can be used as a starting material, and the concentration of the aqueous solution resulting from the melting of the NaOH hydrate crystals is preferable in an industrial operation.

For example, in order to precipitate the $NaOH.2H_2O$ crystals from an aqueous solution of sodium hydroxide produced by the diaphragm electrolysis of sodium chloride, the aqueous solution prepared by the electrolysis is concentrated by a conventional method to prepare an aqueous solution containing 45–52 wt. % of NaOH and 1–2 wt. % of NaCl. The aqueous solution is cooled to form $NaOH.2H_2O$ crystals and impurity crystals, e.g., NaCl. In accordance with the cooling of the aqueous solution, large NaOH hydrate crystals and fine NaCl crystals are formed to obtain a slurry of both crystals.

The purification of sodium hydroxide is conducted by separating the NaCl crystals from the slurry according to the principles of this invention. In the process of this invention, a gas or vaporizable material which is inert to sodium hydroxide is introduced into the aqueous solution to generate bubbles in the slurry containing the NaOH hydrate crystals and the impurity crystals.

Only the impurity crystals are selectively adsorbed on the bubbles formed in the slurry.

The method of forming the bubbles to remove the impurity crystals in the slurry is not critical.

Such methods include introducing a liquid coolant which is inert to sodium hydroxide, directly into the aqueous solution and vaporizing it whereby the NaOH hydrate and impurity crystals are precipitated and the bubbles are formed. Suitable coolants are listed above. Fluorochlorohydrocarbons having a low boiling point are preferred. It is also preferred to dissolve the liquid coolant in the slurry of both crystals. The dissolved gas is vaporized to form the bubbles by reducing the pressure or raising the temperature.

It is also possible to introduce an inert gas such as air, a coolant, helium, nitrogen, argon, hydrogen and the like directly into the slurry through a gas-permeable tube having fine holes.

The impurity crystals are adsorbed on the bubbles formed. The bubbles rise in the slurry while adsorbing the impurity crystals or otherwise having them adhered, whereby a stable foam is formed on the upper surface of the slurry. The stability of the foam increases with the increase of concentration of sodium chloride, reaching the point of becoming difficult to break. When the foam is kept on the upper surface of the slurry, the concentration of sodium chloride in the foam increases forming a scum. Thus, the foam can be easily separated from the slurry as a scum. The slurry from which the foam is removed, contains the NaOH hydrate crystals in high purity. The NaOH hydrate crystals are separated from the aqueous solution by centrifugal filtration, vacuum filtration, centrifugal precipitation separation and the like.

The content of impurities in the resultant sodium hydroxide is dependent upon the type of NaOH hydrate and can be as small as about 0.01 wt. % of NaCl by selection of suitable conditions.

Figure 2:
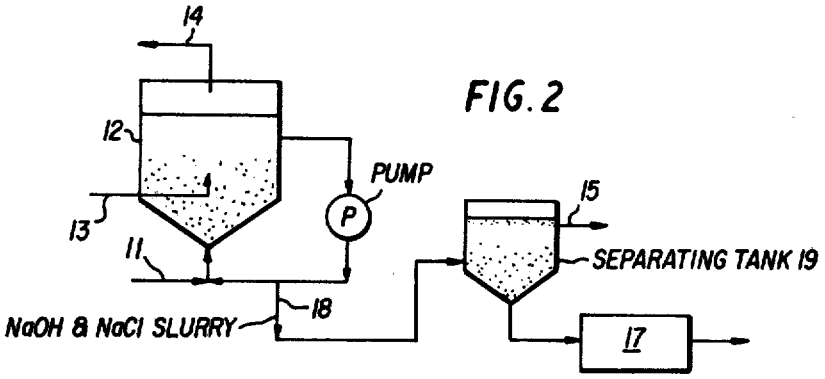
FIG. 2 is a flow diagram of a continuous system of the invention.
Figure 3:
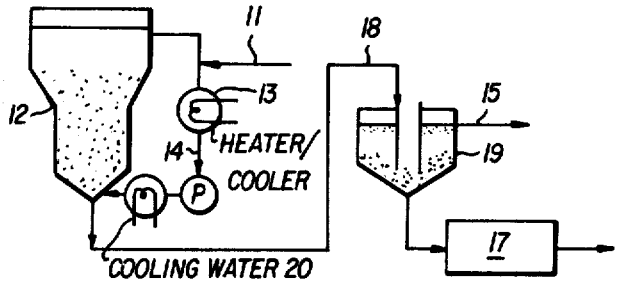
FIG. 3 is a flow diagram of another embodiment of a continuous system of the invention.

Referring to FIGS. 1 to 3, the process of the invention will now be further illustrated. FIG. 1 shows one embodiment of a batch system for producing $NaOH.2H_2O$ in high purity from a concentrated catholyte effluent from the diaphragm electrolysis method.

In FIG. 1, the aqueous solution of sodium hydroxide prepared by the diaphragm electrolysis and the concentrate thereof contain about 45 to 52 wt. % of NaOH and about 1 to 2 wt. % of NaCl. The aqueous solution 11 is fed to a crystallizing tank 12. A liquid coolant 13 such as a fluorochlorohydrocarbon is fed into and vaporized in the crystallizing tank 12 whereby the aqueous solution is cooled to about 5° to 12° C. to precipitate $NaOH.2H_2O$. It is preferred to add $NaOH.2H_2O$ seed crystals in the crystallizing tank 12 with stirring. As a result, a slurry is formed by the precipitating $NaOH.2H_2O$ and fine impurity crystals. The gaseous coolant 14 vaporized in the aqueous solution 11 is discharged out of the system, and is preferably liquefied and recycled.

It is also preferable to maintain a pressure of up to about 10 $kg/cm^2$ in the crystallizing tank 12.

After formation of the slurry containing the $NaOH.2H_2O$ and NaCl impurity crystals, the pressure in the crystallizing tank 12 is reduced to atmospheric pressure whereby the dissolved coolant is vaporized to form bubbles. It is also possible to inject a gas to form bubbles. The fine NaCl impurity crystals are selectively adsorbed on the surface of the bubbles. The bubbles adsorbing the fine NaCl impurity crystals float and accumulate on the upper surface of the slurry as a scum 15. The scum 15 is discharged out of the system and is defoamed to recover the NaCl, etc. On the other hand, the slurry containing $NaOH.2H_2O$ crystals is discharged from the bottom of the crystallizing tank. The slurry 16 is passed through a filter 17 to separate the mother liquor, which is recycled to the crystallizing tank 12. The $NaOH.2H_2O$ crystals are preferably washed with an aqueous solution of sodium hydroxide and melted to obtain about 50% sodium hydroxide having a quite low content of NaCl.

FIG. 2 shows one embodiment of a continuous system, wherein like reference numerals designate parts identical or corresponding to FIG. 1.

A preferred operation will be illustrated.

The aqueous solution of sodium hydroxide containing sodium chloride 11 impurities which is a concentrated catholyte effluent from the diaphragm electrolysis method, is continuously fed into a solution which is recycled from the aqueous solution 11 in the crystallizing tank 12 by a pump p. The concentration and temperature of the recycled solution are controlled to form a slurry containing 5 to 60 wt. %, preferably 10 to 40 wt. %, of $NaOH.2H_2O$ crystals in the crystallizing tank 12.

The conditions of the concentration of aqueous solution, the feed of the coolant 13, the conditions for precipitating the $NaOH.2H_2O$ crystals and impurity and the treatment of the gaseous coolant 14 are the same as in FIG. 1.

Thus, the slurry containing the $NaOH.2H_2O$ and impurity NaCl crystals 18 is discharged from the crystallizing tank 12 as a part of the recycled solution. The slurry 18 is fed to a separating tank 19 wherein the dissolved coolant is vaporized by reducing the pressure or in which a gas is introduced into the slurry to form bubbles. The NaCl impurity crystals are adsorbed on the bubbles and floated for separation. The foam adsorbing the NaCl impurity crystals is discharged as a scum 15. On the other hand, the slurry containing $NaOH.2H_2O$ 16 is discharged from the separating tank 19, the $NaOH.2H_2O$ crystals are filtered and preferably washed, and melted to obtain sodium hydroxide having high purity.

FIG. 3 shows a flow sheet of one embodiment used in Example 3. The invention will be further illustrated by the following examples.

EXAMPLE 1

A catholyte effluent produced by electrolysis of an aqueous solution of sodium chloride by the diaphragm method was concentrated to about 48 wt. %. The aqueous solution of sodium hydroxide contained about 0.95 wt. % of NaCl.

The aqueous solution was used for purifying sodium hydroxide in accordance with the process of FIG. 1.

A liquid difluorodichloromethane was directly and continuously introduced into the aqueous solution to cool the temperature of the aqueous solution to about 8.0° C. whereby the $NaOH.2H_2O$ crystals were precipitated at a rate of 180 Kg/hour, the NaCl impurity crystals were precipitated at a rate of 2.1 Kg/hour and the mother liquor was formed at a rate of 420 Kg/hour.

The $NaOH.2H_2O$ crystals had an average diameter of about 400 μm and the impurity NaCl crystals had an average diameter of about 10 to 15 μm. After stopping the feed of the liquid coolant, the pressure was reduced to form fine bubbles of difluorodichloromethane by vaporization of the dissolved difluorodichloromethane. The NaCl impurity crystals were adsorbed on the bubbles and floated to form a scum layer on the surface of the slurry. The scum was separated. According to analysis, the scum contaned about 13.5 wt. % of NaCl.

The slurry of the NaOH hydrate crystals from which the scum was separated, was treated by centrifugal separation to separate the NaOH hydrate crystals from the mother liquor. The NaOH hydrate crystals were melted. According to analysis, the crystals contained 52.3 wt. % of NaOH and only 0.07 wt. % of NaCl. As a reference, the slurry containing the NaOH hydrate crystals and the NaCl impurity crystals which was formed by the cooling step was treated by centrifugal separation without forming bubbles for adsorption of the NaCl impurity crystals.

The separated $NaOH.2H_2O$ crystals were melted. According to analysis, the crystals contained 52.2 wt. % of NaOH and 0.56 wt. % of NaCl. The content of NaCl was 8 times that of the invention.

EXAMPLE 2

The aqueous solution containing about 48 wt. % of NaOH and about 0.95 wt. % of NaCl prepred in Example 1 was used for purifying in accordance with the process of FIG. 2.

The slurry recycled to the crystallizing tank 12 contained about 30 wt. % of the $NaOH.2H_2O$ crystals. The slurry was discharged from the upper part of the crystallizing tank 12 and was fed from the bottom of the tank 12. Liquid n-butane was introduced through the pipe 13 to vaporize in the tank 12 whereby the temperature was decreased to 7° C. The n-butane gas was passed through the pipe 14, compressed, cooled for liquefaction and the liquid n-butane was recycled to the tank 12.

The aqueous solution of sodium hydroxide containing the impurities was fed through the pipe 11 to the tank 12 at a rate of 522 Kg/hour. The slurry was discharged through the pipe 18 at a rate of about 60 Kg/hour of $NaOH.2H_2O$ crystals, at a rate of about 362 Kg/hour of the mother liquor, and at a rate of about 1.9 Kg/hour of the NaCl impurity crystals.

The resulting $NaOH.2H_2O$ crystals had an average diameter of about 700μ and the impurity NaCl crystals had an average diameter of about 12μ. The slurry was continuously fed to the separating tank 19 and the dissolved n-butane gas in the slurry was vaporized to form bubbles.

The impurity NaCl crystals were adsorbed on the bubbles and floated to form a scum layer on the surface of the slurry.

The scum was continuously removed at a rate of 12 Kg/hour.

According to analysis, the separated scum contained about 15 wt. % of NaCl.

The slurry containing $NaOH.2H_2O$ crystals was discharged from the bottom of the separating tank 19 and was treated by centrifugal separation to separate the $NaOH.2H_2O$ crystals from the mother liquor. The $NaOH.2H_2O$ crystals were melted. According to analysis, the $NaOH.2H_2O$ crystals contained 52.4 wt. % of NaOH and only 0.08 wt. % of NaCl.

As a reference, the slurry discharged from the pipe 18 was treated by centrifugal separation without forming bubbles for adsorption of NaCl impurity crystals. The separated $NaOH.2H_2O$ crystals were melted.

According to analysis, the crystals contained 52.2 wt. % of NaOH and 0.6 wt. % of NaCl.

The content of NaCl was 8 times that of the invention.

EXAMPLE 3

The aqueous solution containing about 48 wt. % of NaOH and about 0.95 wt. % of NaCl prepared in Example 1 was used for purifying in accordance with the process of FIG. 3.

The aqueous solution of sodium hydroxide containing impurities was fed through a pipe 11 at a rate of 300 Kg/hour, together with the solution (about 47 wt. % NaOH; small amount of $NaOH.2H_2O$ crystals) discharged from the upper part of the tank 12. The mixture was heated in a heating device 13 so as to completely dissolve the remaining $NaOH.2H_2O$ crystals. The mixture was cooled in order to cool the aqueous solution in the tank 12 to 7° C. through a pump (p) in a cooling device 14 by heat-exchange controlled by a cooling water 20 to form a supersaturated solution. The supersaturated solution was fed from the lower part of the tank 12 to precipitate the $NaOH.2H_2O$ and NaCl crystals.

A slurry was discharged through the pipe 18 at a rate of about 90 Kg/hour of $NaOH.2H_2O$ crystals; at a rate of about 200 Kg/hour of the mother liquor and at a rate of about 1 Kg/hour of the NaCl impurity crystals. The resulting $NaOH.2H_2O$ crystals had an average diameter of about 1300μ and the impurity NaCl crystals had an average diameter of about 15μ.

The slurry was continuously fed to the separating tank 19 wherein air was fed through an air nozzle disposed at a lower part of the tank at a rate of about 5 $m^3/hour.m^2$.

The impurity NaCl crystals were adsorbed on bubbles formed by air injection and were floated to form a scum layer on the surface of the slurry.

The scum was continuously removed at a rate of 9 Kg/hour.

According to analysis, the separated scum contained about 12 wt. % of NaCl.

The slurry containing $NaOH.2H_2O$ crystals was discharged from the bottom of the separating tank 19 and was treated by centrifugal separation to separate the $NaOH.2H_2O$ crystals from the mother liquor. The $NaOH.2H_2O$ crystals were melted. According to analysis, the $NaOH.2H_2O$ crystals contained 52.4 wt. % of NaOH and only 0.05 wt. % of NaCl.

As a reference, the slurry discharged from the pipe 18 was treated by centrifugal separation without forming bubbles for adsorption of the NaCl impurity crystals. The separated $NaOH.2H_2O$ crystals were melted. According to analysis, the crystals contained 52.1 wt. % of NaOH and 0.58 wt. % of NaCl. The content of NaCl was 11 times that of the invention.

We claim:

1. A process for purifying sodium hydroxide which [comprises] *consists of* cooling an aqueous solution of sodium hydroxide containing soluble impurities to form a slurry containing sodium hydroxide hydrate crystals and the fine impurity crystals;

forming bubbles in said slurry, whereby said impurity crystals are adsorbed on the bubbles and float upward therewith to form a foamed scum on said slurry; and removing said scum from said slurry, thereby separating the impurity crystals from the sodium hydroxide crystals.

2. The process of claim 1 wherein said aqueous solution of sodium hydroxide containing soluble impurities contains sodium chloride as the principal impurity and is produced by electrolysis of an aqueous solution of sodium chloride using the diaphragm method.

3. The process of claim 1, wherein said aqueous solution of sodium hydroxide containing soluble impurities contains from 0.1 to 3.6 wt. % of dissolved sodium chloride and 33 to 60 wt. % of sodium hydroxide.

4. The process of claim 1, wherein said aqueous solution of sodium hydroxide containing soluble impurities contains from 1 to 2 wt. % of sodium chloride and 45 to 52 wt. % of sodium hydroxide.

5. The process of claim 1, wherein the sodium hydroxide hydrate crystals are $NaOH.2H_2O$ crystals.

6. The process of claim 1 wherein said cooling is achieved by directly contacting said solution with a liquid coolant, and wherein said bubbles are formed by vaporizing said coolant which is dissolved in said slurry.

7. The process of claim 1 wherein said bubbles are formed by introducing, into said slurry, a gas which is inert to sodium hydroxide.

8. The process of claim 7, wherein said inert gas is dissolved, under pressure, in the slurry containing sodium hydroxide hydrate crystals and fine impurity crystals and thereafter said pressure is released to form bubbles in the slurry.

9. The process of claim 7, wherein said inert gas is a fluorochlorohydrocarbon having a low boiling point.

10. The process of claim 6 wherein said dissolved coolant is vaporized by reduction of the pressure on said slurry.

11. The process of claim 10, wherein the formation of the slurry and the separation of the impurity crystals are conducted in a single chamber.

12. The process of claim 10, wherein the formation of the slurry and the separation of the impurity crystals are each continuously conducted in separate chambers.

13. The process of claim 10, wherein said pressure is reduced by exposure of said slurry to atmospheric pressure.

14. The process of claim 10, wherein said coolant is a fluorochlorohydrocarbon or a hydrocarbon which has a low boiling point.

15. The process of claim 10, wherein said sodium hydroxide hydrate crystals are $NaOH.2H_2O$ crystals.

16. The process of claim 4, wherein said aqueous solution of sodium hydroxide is cooled to 5°–12° C.

17. The process of claim 5, wherein said aqueous solution of sodium hydroxide is cooled to 5°–12° C.

* * * * *